United States Patent [19]
Inoue et al.

[11] Patent Number: 5,859,822
[45] Date of Patent: Jan. 12, 1999

[54] OPTICAL DISC PLAYER CAPABLE OF REPRODUCING A PLURALITY OF DIFFERENT TYPES OF OPTICAL DISCS

[75] Inventors: Masayuki Inoue; Toshiaki Ishibashi; Yoshio Suzuki, all of Yokohama, Japan

[73] Assignee: Hitachi, Ltd., Tokyo, Japan

[21] Appl. No.: 766,780

[22] Filed: Dec. 13, 1996

[51] Int. Cl.⁶ .................................................. G11B 3/90
[52] U.S. Cl. ........................................................... 369/58
[58] Field of Search ................................. 369/58, 54, 116, 369/44.37, 44.26

[56] References Cited

U.S. PATENT DOCUMENTS

| | | | |
|---|---|---|---|
| 5,003,521 | 3/1991 | Yoshida et al. | 369/54 |
| 5,274,622 | 12/1993 | Kono | 369/116 |
| 5,381,392 | 1/1995 | Hira | 369/58 |
| 5,465,245 | 11/1995 | Yanagawa | 369/58 |
| 5,513,164 | 4/1996 | Tanaka et al. | 369/112 |
| 5,684,773 | 11/1997 | Hayashi | 369/58 |

FOREIGN PATENT DOCUMENTS 8-221890  8/1996  Japan .

OTHER PUBLICATIONS

Hideki Hayashi et al. "Optical Information Recording And Reproducing Device", Sep. 16, 1994.

*Primary Examiner*—Tan Dinh
*Attorney, Agent, or Firm*—Antonelli, Terry, Stout & Kraus, LLP

[57] ABSTRACT

In reproducing an optical disc, the disc is reproduced first using a semiconductor laser of 770–800 nm in wavelength for CD, and if a correct data signal is obtained, the optical disc is identified as a CD, while if a correct data signal is not obtained, the optical disc is identified as a high-density optical disc and is reproduced using a semiconductor laser for high-density optical disc. According to this construction there can be provided an optical disc player capable of discriminating between different types of optical discs and reproducing the discs with semiconductor lasers respectively suitable for the discs. Since a CD and a write-once type optical disc compatible with the CD are sure to be reproduced by a semiconductor laser of 770–800 nm for CD, it is impossible that there will occur breakdown of a recording layer of the write-once disc.

8 Claims, 4 Drawing Sheets

OPTICAL DISC PLAYER CAPABLE OF REPRODUCING A PLURALITY OF DIFFERENT TYPES OF OPTICAL DISCS

BACKGROUND OF THE INVENTION

The present invention relates to an optical disc player for reproducing optical discs of different recording densities.

PRIOR ART

Compact disc (hereinafter referred to simply as "CD") is presently in wide use for music or for computer data. The CD has a diameter of 120 mm, a track pitch of about 1.6 μm and a minimum pit length of about 0.9 μm. Since the CD is an optical disc for reproduction only, it uses an aluminum layer as a reflecting layer, whose reflectance is 70–80%. An optical disc player for reproducing the CD employs a semiconductor laser of 770–800 nm in wavelength. Laser beam from the semiconductor laser is focused onto the optical disc by means of an objective lens, whose numerical aperture (NA) is usually 0.45 or so.

As described in "Application of High Reflectivity Write-Once Disc to Recordable CD" at pages 612–613 of OPTICS, Vol. 18, No. 11 (November 1989), a write-once type optical disc capable of recording a signal once is also in practical use. The write-once type optical disc employs an organic dye as a signal recording layer and is constructed to afford a reflectance of 70% or more at a wavelength of 770–800 nm so that the optical disc after signal recording can be reproduced by an optical disc player for the reproduction of CD.

On the other hand, the recent progress of semiconductor laser is remarkable and a semiconductor laser which emits a red light of 690–630 nm in wavelength has been put to practical use. A combination of such a semiconductor laser with an objective lens of 0.55–0.6 in numerical aperture has led to a proposal of a high-density optical disc having a recording density three to four times as high as the recording density of the present CD (see, for example, 1993 Autumn Convention, The Institute of Electronics, Information and Communication Engineers, Lecture No. C-364 "Study of High Density CD-ROM using Visible Laser Pick-up").

Assuming that the aforesaid high-density optical disc will be put to practical use in future, it is desirable as a matter of course that an optical disc player for reproducing the said optical disc be able to also reproduce the conventional CD and a write-once type optical disc compatible with the CD. In an effort to meet this requirement there has been proposed such an optical disc player as is disclosed in Japanese Patent Laid Open No. 6-259804 (1994). This proposed optical disc player is provided with both a semiconductor laser for reproducing the conventional CD and a semiconductor laser of a shorter wavelength for reproducing the high-density optical disc. One of the two semiconductor lasers is selected according to the type of optical disc to be reproduced and a signal is reproduced with a laser beam emitted from the selected laser.

The optical disc player for reproducing the high-density optical disc is required to discriminate between the conventional CD and the high-density optical disc, selectively light the semiconductor laser corresponding to the optical disc to be reproduced, and reproduce a signal with reflected light. Further, as to a write-once type optical disc compatible with CD, it is necessary to take measures sufficient for the prevention of breakdown as will be described below.

FIG. 4 shows an example of spectral characteristics of both reflectance and absorptance of an optical disc using an organic dye-based material as a recording layer like the aforesaid write-once type optical disc. Although a reflectance of 70% or more is attained at a wavelength of 770–800 nm, the reflectance at a wavelength of 630–690 nm, which wavelength is for reproduction of the high-density optical disc, drops to 20% or so. On other hand, the absorptance at a wavelength of 770–800 nm is about 20%, but at a wavelength of 630–690 nm it is a little over 70%, which is about three to four times the absorptance at 770–800 nm. The upper limit of a reproducing laser power at 770–800 nm of this write-once type optical disc is approximately 0.8 mW. If the laser power is increased beyond this upper limit, there is a fear of breakdown of the recording layer due to a local rise of temperature at the portion on which a reproducing optical spot strikes. At 630–690 nm, however, the absorptance is three to four times higher and the area of the reproducing optical spot is about 1/2.5, so that the upper limit of the reproducing laser power is about 0.1 mW or less. In order to obtain a playback signal having a large signal to noise ratio (SN), the larger the reproducing laser power, the better, as a matter of course, which laser power is usually 0.1–0.5 mW. Consequently, where a write-once type optical disc compatible with CD is to be reproduced by a player for reproducing the high-density optical disc, if the reproduction is performed using a light source of 630–690 nm, it is likely that there will occur breakdown of the recording layer of the disc.

For this reason, in the optical disc player for reproducing the high-density optical disc, it is desirable that the conventional CD and write-once type optical disc be discriminated from the high-density optical disc and that the CD and the write-once disc be reproduced using a light source of 770–800 nm to prevent breakdown of the write-once disc.

In the foregoing conventional optical disc player, however, no consideration has been given to discriminating the type of optical disc and protecting the write-once disc.

SUMMARY OF THE INVENTION

As disclosed in the foregoing literature, the high-density optical disc is about half of the conventional CD in track pitch and minimum pit length. In using a light source of 770–800 nm for reproduction of the CD, the reproducing optical spot used is too large for the high-density optical disc and it is impossible to effect reproduction. Taking note of this point, the present invention was accomplished, which first tries optical disc reproduction using the CD reproducing light source of 770–800 nm. Then, if the reproduction is feasible, the disc for reproduction is identified to be the conventional CD or write-once disc compatible with the CD and reproduction is continued. On the other hand, if reproduction is infeasible, the disc for reproduction is identified to be the high-density optical disc and reproduction is conducted using a light source of 630–690 nm which is for reproduction of the high-density optical disc.

In the optical disc player according to the present invention, first reproduction is tried using the light source of 770–800 nm to discriminate the type of the disc for reproduction. Therefore, since the write-once disc compatible with CD is sure to be reproduced by the light source of 770–800 nm, there is no fear of breakdown of its recording layer.

DESCRIPTION OF THE PREFERRED EMBODIMENTS (Embodiment 1)

Figure 1:
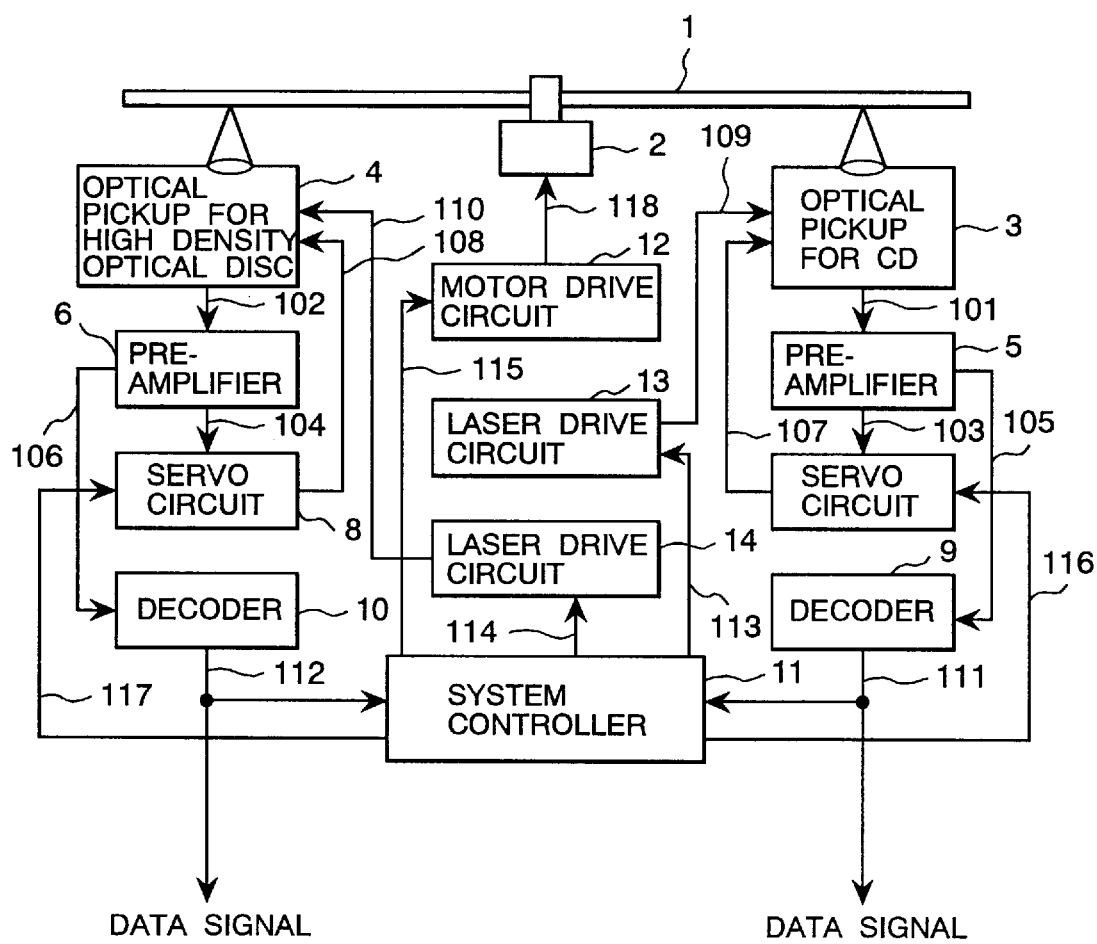
FIG. 1 is a circuit block diagram of an optical disc player according to a first embodiment of the present invention.

The first embodiment of the present invention will now be described with reference to the accompanying drawings. FIG. 1 is a circuit block diagram of an optical disc player according to the present invention. An optical disc 1 is loaded onto a disc motor 2. Description will now be given about the case where the optical disc 1 is the conventional CD and a write-once disc compatible with the CD. In accordance with a control signal 115 provided from a system controller 11, a motor drive circuit 12 outputs a motor drive signal 118 to rotate the disc motor 2. Next, in accordance with a control signal 113 provided from the system controller 11, a laser drive circuit 13 outputs a laser drive signal 109 to light a semiconductor laser (not shown) disposed in an optical pickup 3 of CD. A detecting signal 101 provided from a photodiode (not shown) in the optical pickup 3 for CD is fed to a preamplifier 5, which in turn outputs a servo signal 103 and an RF signal 105. On the basis of a control signal 116 provided from the system controller 11 and the servo signal 103 a servo circuit 7 outputs an actuator drive signal 107 to drive a lens actuator (not shown) in the optical pickup 3 for CD, whereby focusing control and tracking control are performed. A decoder 9 decodes the RF signal 105 into a data signal 111. The data signal 111 is fed to the system controller 11, which in turn, in accordance with a clock signal contained in the data signal 111, controls the motor drive circuit 12 to rotate the optical disc 1 at a predetermined speed. On the other hand, the data signal 111 is converted to, for example, an audio signal or a video signal. Reference will now be made to the case where the optical disc 1 is a high-density optical disc. The optical disc 1 is loaded onto the disc motor 2. In accordance with the control signal 115 provided from the system controller 11 the motor drive circuit 12 outputs the motor drive signal 118 to rotate the disc motor 2. Next, in accordance with a control signal 114 provided from the system controller 11, a laser drive circuit 14 outputs a laser drive signal 110 to light a semiconductor laser (not shown) disposed in an optical pickup 4 which is for high-density optical disc. A detecting signal 102 provided from a photodiode (not shown) in the optical pickup 4 is fed to a preamplifier 6, which in turn outputs a servo signal 104 and an RF signal 106. On the basis of a control signal 117 provided from the system controller 11 and the servo signal 104 a servo circuit 8 outputs an actuator drive signal 108 to drive a lens actuator (not shown) in the pickup 4 for high-density optical disc, whereby there are performed focusing control and tracking control. A decoder 10 decodes the RF signal 106 into a data signal 112. The data signal 112 is fed to the system controller 11, which in turn, in accordance with a clock signal contained in the data signal 112, controls a motor drive circuit 12 to rotate the optical disc 1 at a predetermined speed. On the other hand, the data signal 112 is converted to, for example, an audio signal or a video signal.

Figure 2:
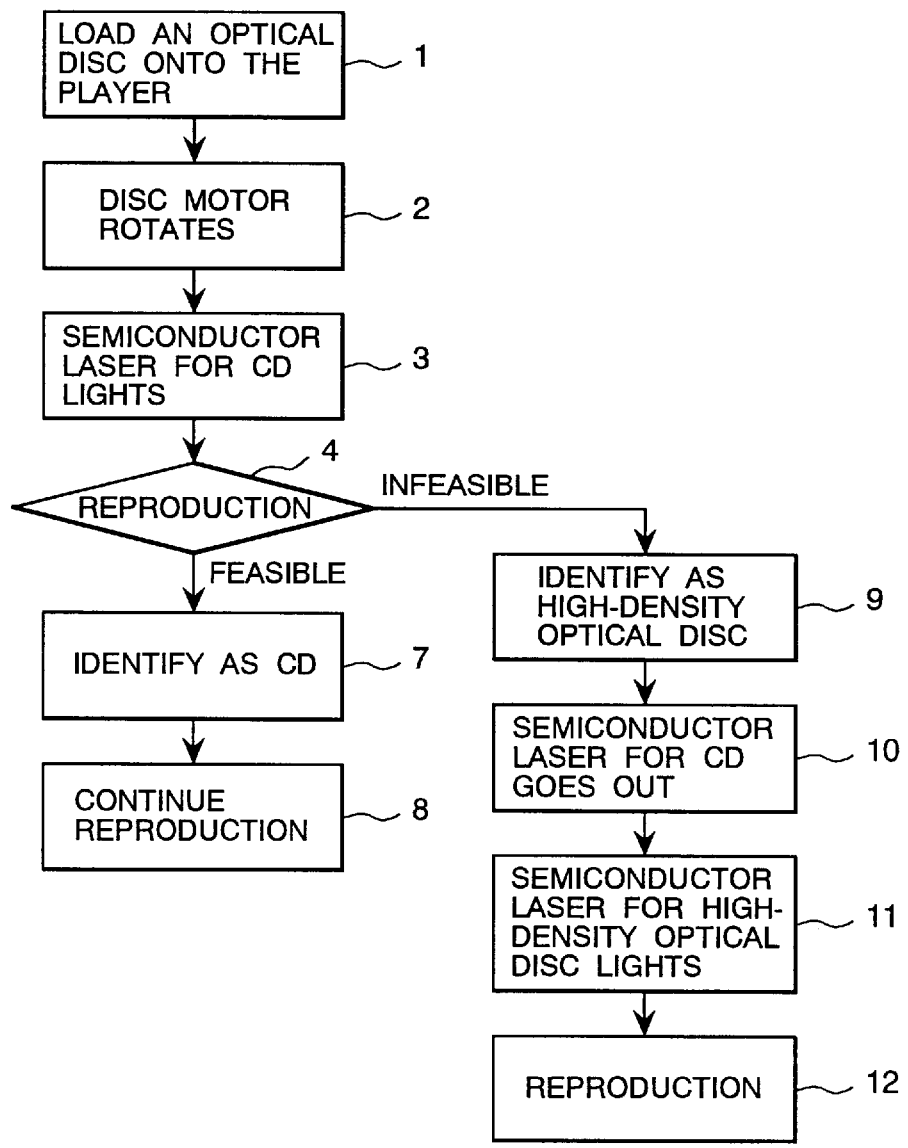
FIG. 2 is a flow chart showing a series of operations of the optical disc player.

FIG. 2 is a flow chart explaining a series of operations of the optical disc player shown in FIG. 1. Upon loading of the optical disc 1 onto the optical disc player, the disc motor 2 rotates and the semiconductor laser for CD lights. Subsequently, there are performed focusing control, tracking control and revolutional speed control for the disc motor 2, and the data signal 111 is outputted from the decoder 9. In the case where the optical disc for reproduction is a CD, the system controller 11, in accordance with the data signal, identifies the optical disc being reproduced as a CD and continues reproduction. However, if the optical disc is a high-density optical disc, it is very likely that the servo control, especially tracking control, will become infeasible. This is because the track pitch of the high-density optical disc is about one half of that of CD. Further, even if the tracking control is feasible, it will be impossible to obtain a correct data signal because the minimum pit length of the high-density optical disc is about one half of that of CD. Thus, in both cases there is not obtained a correct data signal. Therefore, the system controller 11 identifies the optical disc being reproduced as a high-density optical disc and not a CD. As a result, the system controller 11 stops focusing control and tracking control, turns off the semiconductor laser for CD and turns on the semiconductor laser for high-density optical disc. Then, in the same manner as in the case of CD described above the system controller performs focusing control, tracking control and revolutional speed control to reproduce the high-density optical disc.

A concrete construction of the optical pickup has not been described above because it has no bearing on the essence of the present invention, but it may be such a construction as disclosed in Japanese Patent Laid Open No. 61-61240 (1986) for example.

(Embodiment 2)

Figure 3:
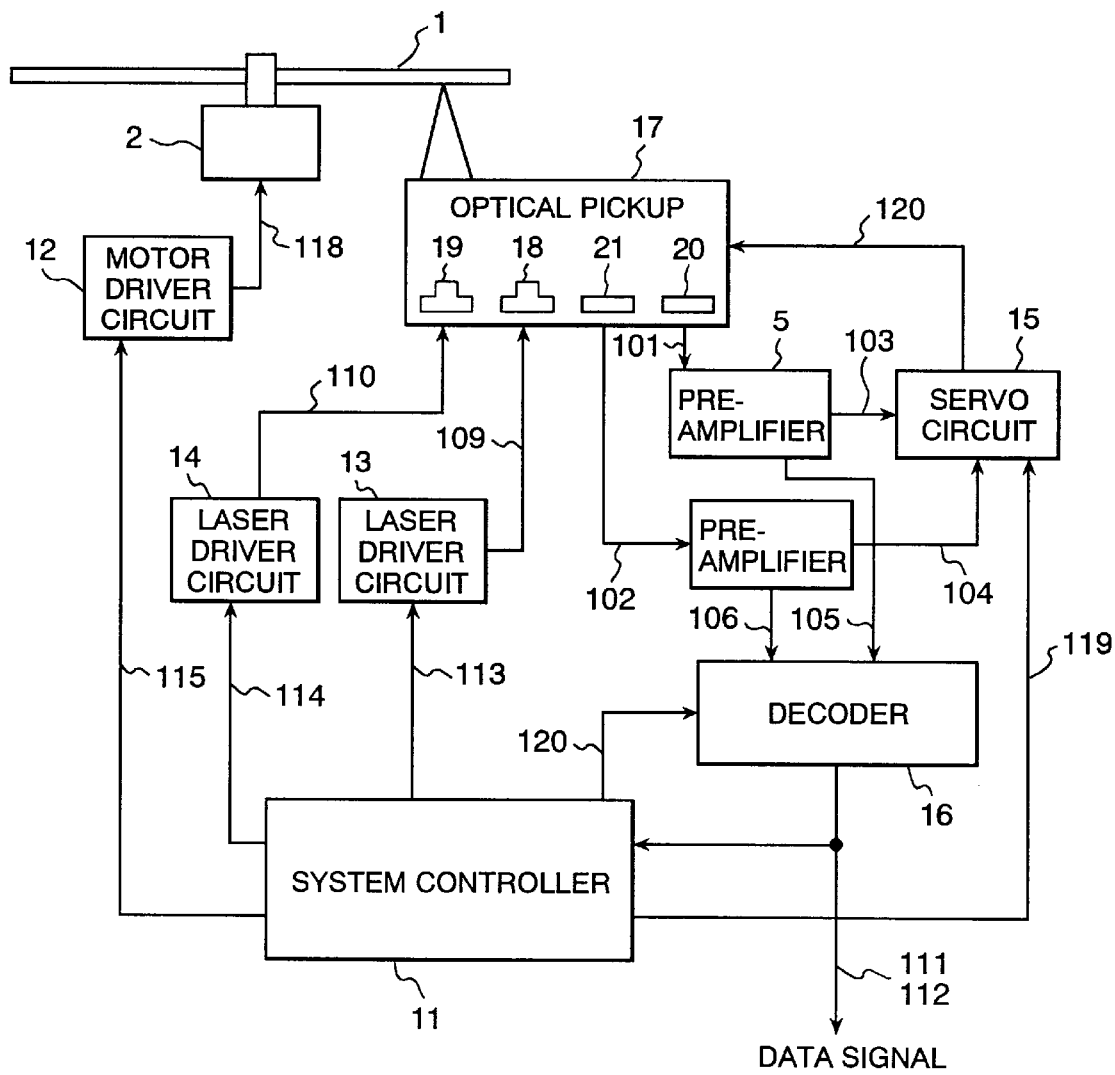
FIG. 3 is a circuit block diagram of an optical disc player according to a second embodiment of the present invention.
Figure 4:
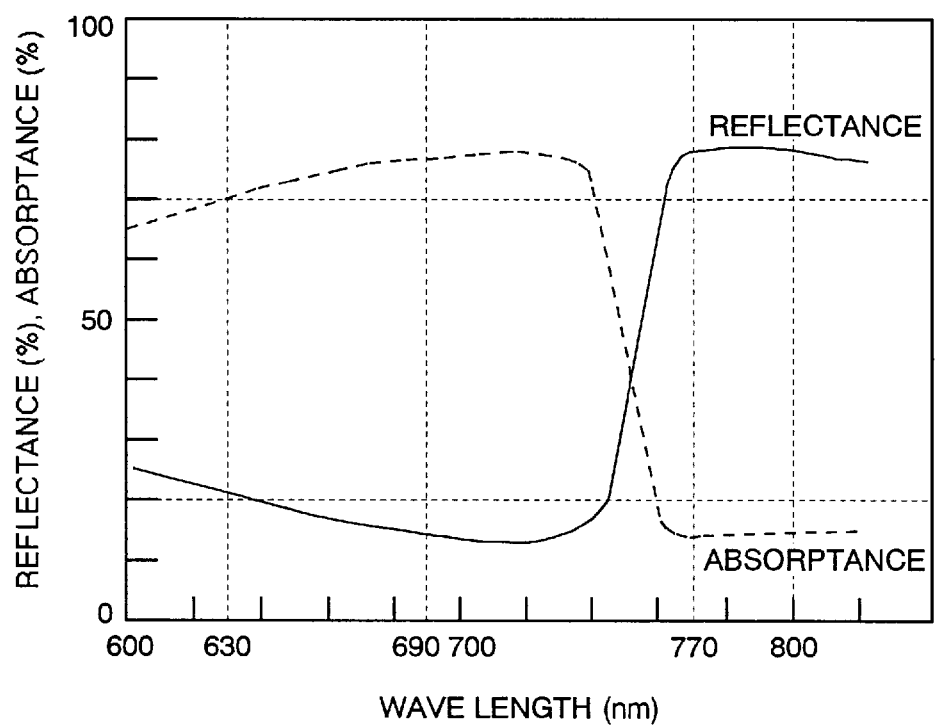
FIG. 4 is a graph showing spectral characteristics of reflectance and absorptance of a write-once disc compatible with CD.

Description is now directed to the second embodiment of the present invention. FIG. 3 is a circuit block diagram of an optical disc player according to the second embodiment of the invention, in which the same components, circuits and signals as in FIG. 1 are indicated by the same reference numerals as in FIG. 1. The second embodiment is different in the construction of optical pickup from the first embodiment illustrated in FIG. 1. The optical pickup used in the second embodiment, which is indicated at 17, is provided with two semiconductor lasers, two photodiodes and an objective lens. For example, the optical pickup 17 may be of such a construction as disclosed in Japanese Patent Laid Open No. 6-259804 (1994) which corresponds to the foregoing prior art. Upon loading of an optical disc 1 onto a disc motor 2, a motor drive circuit 12 outputs a motor drive signal 118 in accordance with a control signal 115 provided from a system controller 11 to rotate a disc motor 2. Next, in accordance with a control signal 113 provided from the system controller 11 a laser drive circuit 13 outputs a laser drive signal 109 to light a semiconductor laser 18 for CD disposed in the optical pickup 17. A detecting signal 101 provided from a photodiode 20 for CD in the optical pickup 17 is fed to the preamplifier 5, which in turn outputs a servo signal 103 and an RF signal 105. On the basis of a control signal 119 provided from the system controller 11 and a servo signal 103 a servo circuit 15 outputs an actuator drive signal 120 to drive an lens actuator (not shown) in the optical pickup, whereby there are performed focusing control and tracking control. A decoder 16 common to both CD and high-density optical disc decodes the RF signal 105 into a data signal 111. The data signal 111 is fed to the system controller 11, which in turn, in accordance with a clock signal contained in the data signal 111, controls the motor drive circuit 12 to rotate the optical disc 1 at a predetermined speed. On the other hand, the data signal 111 is converted to, for example, an audio signal or a video signal. Now, a description will be given of the case where the optical disc 1 is a high-density optical disc. In accordance with the control signal 115 provided from the system controller 11 the motor drive circuit 12 outputs the motor drive signal 118 to rotate the disc motor 2. Next, in accordance with a control signal 114 provided from the system controller 11 a laser drive circuit 14 outputs a laser drive signal 110 to light a semiconductor laser 19 for high-density optical disc. A detecting signal 102 provided from a photodiode 21 for high-density optical disc is applied to a preamplifier 6, which in turn outputs a servo signal 104 and an RF signal 106. On the basis of the control signal 119 provided from the system controller 11 and the servo signal 104 the servo circuit 15 outputs the actuator drive signal 120 to drive the lens actuator (not shown) disposed in the optical pickup 17 to make focusing control and tracking control. The common decoder 16 decodes the RF signal 106 into a data signal 112. The data signal 112 is applied to the system controller 11, which in turn, in accordance with a clock signal contained in the data signal 112, controls the motor drive circuit 12 to rotate the optical disc 1 at a predetermined speed. On the other hand, the data signal 112 is converted to, for example, an audio signal or a video signal. Although in the embodiment illustrated in FIG. 3 there is used a common decoder, there may be used separate decoders as in FIG. 1. A series of operations of the optical disc player illustrated in FIG. 3 may be carried out in the same manner as in the flow chart of FIG. 2.

In the optical disc player provided with a semiconductor laser for CD and a semiconductor laser for high-density optical disc according to the present invention, reproduction is tried first using the semiconductor laser for CD which is of 770–800 nm to identify the type of the optical disc being reproduced and therefore a write-once disc compatible with CD is sure to be reproduced by the semiconductor laser for CD of 770–800 nm, with no fear of breakdown of its recording layer.

What is claimed is:

1. In an optical disc player including
   a first light source which emits a luminous flux of a first wavelength for reproducing a first optical disc,
   a second light source which emits a luminous flux of a second wavelength shorter than the first wavelength for reproducing a second optical disc having a recording density higher than that of the first optical disc,
   lens means for focusing the luminous fluxes of the first and second wavelengths onto the optical discs, and
   photodiodes for receiving reflected lights from the first and second optical discs,
   the improvement characterized by further including
      means for discriminating between the first optical disc and the second optical disc,
         wherein if it is possible to reproduce a signal from an optical disc by the first light source, the optical disc being reproduced is identified as the first optical disc and the signal is reproduced by the first light source, while if it is impossible to reproduce a signal by the first light source, the optical disc being reproduced is identified as the second optical disc and the signal is reproduced by the second light source.

2. An optical disc player according to claim 1, wherein at the time of starting reproduction of an optical disc, reproduction is tried first using the first light source, and if the reproduction is possible, the optical disc is identified as the first optical disc and the reproduction is continued, while if the reproduction is impossible, the optical disc is identified as the second optical disc and reproduction is performed using the second light source.

3. In an optical disc player including
   a first light source which emits a luminous flux of a first wavelength for reproducing a first optical disc,
   a second light source which emits a luminous flux of a second wavelength shorter than the first wavelength for reproducing a second optical disc having a recording density higher than that of the first optical disc,
   lens means for focusing the luminous fluxes of the first and second wavelengths onto the optical discs, and
   photodiodes for receiving reflected lights from the first and second optical discs,
   the improvement characterized by further including
      means for discriminating between the first optical disc and the second optical disc,
         wherein the means for discriminating discriminates between the first optical disc and the second optical disc by first trying to reproduce an optical disc by the first light source and determining whether the optical disc being reproduced is the first optical disc or the second optical based on a result of trying to reproduce the optical disc by the first light source.

4. An optical disc player capable of reproducing a first type of optical disc and a second type of optical disc having a recording density higher than a recording density of the first type of optical disc, the optical disc player comprising:
   a first light source which emits light having a first wavelength for reproducing the first type of optical disc;
   a second light source which emits light having a second wavelength shorter than the first wavelength for reproducing the second type of optical disc;
   focusing means for focusing the light having the first wavelength and the light having the second wavelength on an optical disc;
   light receiving means for receiving reflected light having the first wavelength and reflected light having the second wavelength from the optical disc; and
   discriminating means for discriminating whether the optical disc is the first type of optical disc or the second type of optical disc by
      first trying to reproduce the optical disc using the light having the first wavelength,
      if the optical disc is successfully reproduced using the light having first wavelength, identifying the optical disc as the first type of optical disc and continuing to reproduce the optical disc using the light having the first wavelength, and
      if the optical disc cannot be successfully reproduced using the light having first wavelength, identifying the optical disc as the second type of optical disc and reproducing the optical disc using the light having the second wavelength.

5. An optical disc player according to claim 4, wherein the light having the first wavelength has a wavelength of 770 nm to 800 nm; and
   wherein the light having the second wavelength has a wavelength of 630 nm to 690 nm.

6. An optical disc player according to claim 4, wherein the first type of optical disc is susceptible to breakdown if reproduction of the first type of optical disc is attempted using the light having the second wavelength.

7. An optical disc player capable of reproducing a first type of optical disc and a second type of optical disc having a recording density higher than a recording density of the first type of optical disc, the optical disc player comprising:
   a first light source which emits light having a first wavelength for reproducing the first type of optical disc;

a second light source which emits light having a second wavelength shorter than the first wavelength for reproducing the second type of optical disc;

focusing means for focusing the light having the first wavelength and the light having the second wavelength on an optical disc;

light receiving means for receiving reflected light having the first wavelength and reflected light having the second wavelength from the optical disc; and discriminating means for discriminating whether the optical disc is the first type of optical disc or the second type of optical disc by first trying to reproduce the optical disc using the light having the first wavelength, and discriminating whether the optical disc is the first type of optical disc or the second type of optical disc based on a result of trying to reproduce the optical disc using the light having the first wavelength.

8. An optical disc player according to claim 1, wherein the first type of optical disc is susceptible to breakdown if reproduction of the first type of optical disc is attempted using the light having the second wavelength.

* * * * *